Patented Dec. 16, 1941

2,266,177

UNITED STATES PATENT OFFICE 2,266,177

TREATMENT OF MONOMERIC VINYL CHLORIDE

Robert Charles Dosser and James Bertram Arnold, Midland, Mich., assignors to The Dow Chemical Company, Midland, Mich., a corporation of Michigan No Drawing. Application August 7, 1939, Serial No. 288,775

1 Claim. (Cl. 260—656)

This invention relates to a process for the purification of monomeric vinyl chloride obtained in the pyrolysis of ethylene chloride. It is also concerned with a method of increasing the polymerization rate of monomeric vinyl chloride obtained by pyrolytic processes.

It is an object of the invention to provide a procedure whereby monomeric vinyl chloride can be obtained which is readily polymerizable. It is a further object of the invention to provide a method of purifying monomeric vinyl chloride containing impurities which cannot readily be separated therefrom by fractional distillation. It is still another object of this invention to provide a method of preparing polyvinyl chloride.

The thermal decomposition or pyrolysis of ethylene chloride by passing the ethylene chloride into an externally heated tube, or by the admixing of ethylene chloride with highly superheated vapors, or by passing the ethylene chloride into molten catalytic baths, has been disclosed. We have prepared vinyl chloride in each of these ways and subsequently polymerized the monomeric vinyl chloride both by the use of heat and catalysts and in the presence of light. Polyvinyl chloride obtained according to these procedures is a fairly stable product of established utility. The disadvantage inhering to such procedure arises principally out of the relatively slow rate at which the monomer can be made to polymerize.

We have now found that monomeric vinyl chloride prepared according to any of the procedures hereinbefore recited can be so treated to yield a monomer which is readily polymerizable and which yields a very stable polymer. Our procedure includes the step of treating the monomeric vinyl chloride, after it is separated from the thermal decomposition products of ethylene chloride, with sulfuric acid before it is subjected to polymerizing conditions.

The following example illustrates the practice of our invention:

Ethylene chloride was pyrolyzed at a temperature of about 600–680° C. in an externally heated tube 30 feet long and having an internal diameter of ⅜ inch, at a rate of flow of 35# per hour, in the presence of steam. Thereafter, the product so obtained was subjected to fractional distillation, to separate the vinyl chloride boiling at —13° to —14° C. When such vinyl chloride is subjected, without further treatment, to polymerization in the presence of 0.5% benzoyl peroxide as a catalyst, and at a temperature of 40° C., polymerization takes place to the extent of less than 5 per cent in 24 hours.

If however, the vinyl chloride is contacted with sulfuric acid of 88–96 per cent concentration for a period of about 4–10 seconds before being subjected to identical polymerizing conditions, we have found that at least 25–30 per cent of the polymer will be obtained. We have also determined, by way of showing the relative rates of polymerization of the untreated and the sulfuric acid treated monomer, that, under identical polymerizing conditions at 40° C. using 0.5 per cent by weight of benzoyl peroxide, only 1 per cent of the untreated monomer will be polymerized in 5 hours in contrast with 5 per cent of the treated monomer. After 16 hours, only 3 per cent of the untreated monomer will be polymerized as against 20 per cent of the treated monomer. And at 24 hours, 4 per cent of the untreated against 35 per cent of the treated monomer is polymerized. This illustrates the polymerization accelerating effect of the sulfuric acid treatment of monomeric vinyl chloride obtained according to thermal decomposition procedures.

The optimum concentration of sulfuric acid which is employed in carrying out our treatment is above about 88 per cent by weight. We have employed concentrations of 96 per cent with satisfactory results. The contact time will depend in part upon concentration of the acid, but should preferably exceed about 4 seconds. No particular advantage has been obtained by extending the contact time beyond about 10 seconds, unless the acid is quite dilute. The treatment may be carried out by passing the vinyl chloride at a temperature of about 25° C. countercurrent to a downward flow of sulfuric acid of suitable concentration in a ring-packed tower. Somewhat higher temperatures may be used. Other methods of contacting the vinyl chloride in the gas phase with sulfuric acid may be employed. Vinyl chloride may be treated in the liquid phase with equally good results. After contact with the acid, the monomer is preferably neutralized, dried as over calcium chloride, compressed and liquefied.

We claim:

In a method of purifying monomeric vinyl chloride obtained in pyrolyzing ethylene chloride, the step which consists in subjecting said monomeric vinyl chloride to the action of sulphuric acid having a concentration of above about 88 per cent by weight.

ROBERT CHARLES DOSSER.
JAMES BERTRAM ARNOLD.